March 20, 1945.    R. C. SNEED ET AL    2,371,783
CONVEYING MECHANISM
Filed Aug. 18, 1942
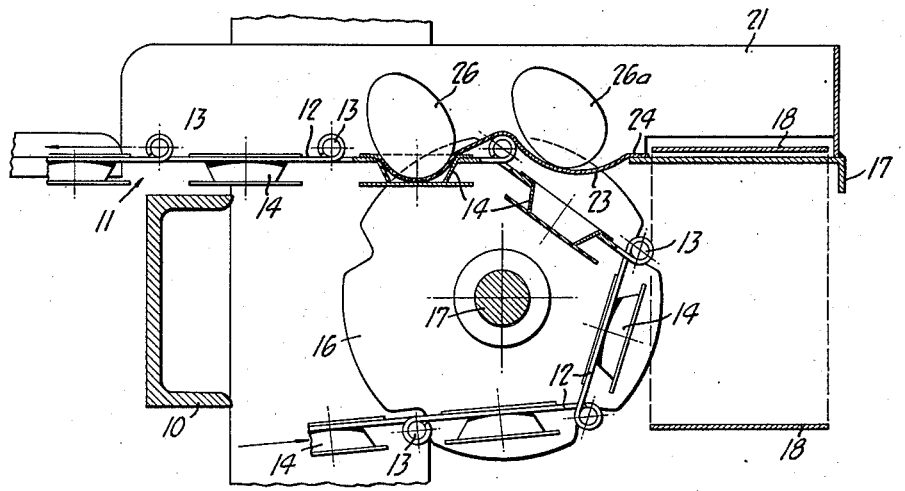
FIG_1_
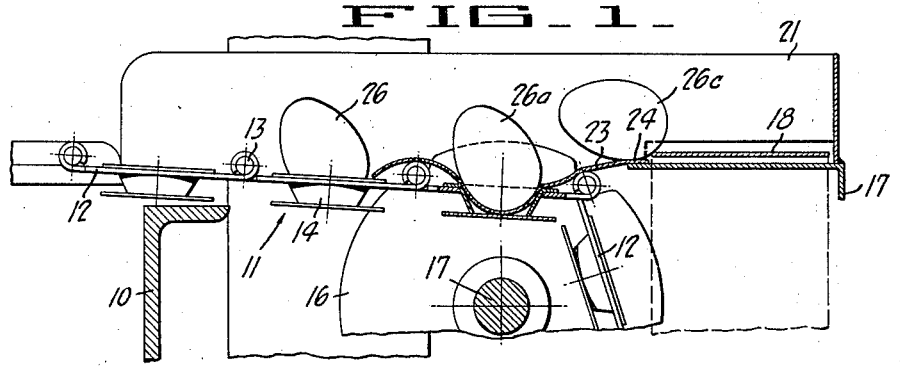
FIG_2_
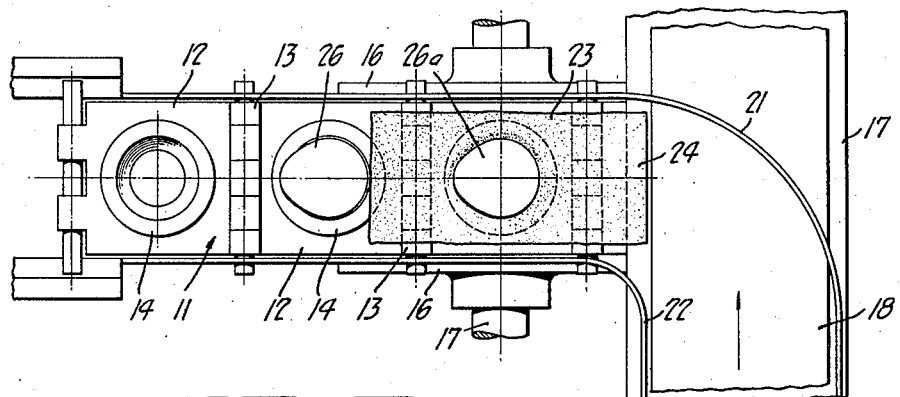
FIG_3_
INVENTORS
Robert C. Sneed
Curtis S. Jordan
BY
Paul D. Flehr
ATTORNEY.

Patented Mar. 20, 1945

2,371,783

UNITED STATES PATENT OFFICE 2,371,783

CONVEYING MECHANISM

Robert C. Sneed, Piedmont, and Curtis S. Jordan, Glendale, Calif., assignors to Safeway Stores, Inc., Oakland, Calif., a corporation of California Application August 18, 1942, Serial No. 455,182

4 Claims. (Cl. 198—20)

This invention relates to egg handling machines such as egg grading machines, as concerned more particularly with the provision of an improved form of transfer device for effecting transfer of eggs, one by one, from a conveyor on which they are indiscriminately arranged, to a second conveyor on which they are carried individually.

It is an object of the invention to provide an improved transfer device for feeding eggs one by one to an articulated cup type conveyor.

Other objects of the invention provide a transfer device of the above character which is simple in construction and which is effective in its mode of operation.

Other objects and advantages of the invention will be apparent from the following description of the preferred embodiments thereof as illustrated in the accompanying drawing in which:

Figure 1 is a fragmentary sectional view, taken transverse to the axis of the egg-receiving conveyor and showing the transfer device in operation.

Figure 2 is a fragmentary view similar to Figure 1 showing the transfer device at a different phase of its operation.

Figure 3 is a fragmentary plan view of the structure shown in Figures 1 and 2.

The invention is illustrated as embodied in an egg grading machine of the character disclosed in the copending application of Robert C. Sneed and Curtis S. Jordan, Serial No. 438,720, filed April 13, 1942, for Egg grading machine. Briefly, in this type of machine, the eggs are graded as to quality by candling and each particular quality grade is placed on a feed conveyor convenient to the candler in indiscriminate arrangement. Subsequently, the eggs from each feed conveyor are transferred to a weight grading conveyor in which the eggs must be handled separately for the weight grading operation.

Referring to the drawing, the egg grading machine may include a framework 10 on which an articulated link conveyor of the weight grading type is indicated generally as 11. The conveyor 11 includes a series of links 12 joined by hinges 13. Each link 12 loosely carries a cup-shaped member 14 which is adapted to receive an egg and subsequently support it on a weighing device of suitable form (not shown) independently of the conveyor.

The conveyor 11 has its hinge pins 13 adapted for engagement with a pair of idler sprockets 16, secured on a suitable shaft 17 at the feed end of the conveyor. A suitable pair of drive sprockets (not shown) are provided at the opposite end of the conveyor. Adjacent to the feed end of the conveyor 11 an auxiliary feed conveyor frame 17 is provided, about which an endless belt-type feed conveyor 18 is trained. Respective upright guide walls 21 and 22 (Figure 3), extend along the feed conveyor 18 and part-way along the weighing conveyor 11. The intermediate portions of walls 21 and 22 are curved to direct eggs from the feed conveyor 18 into the path of travel of the weighing conveyor 11 as its links 12 are rising in travelling around the sprockets 16.

In order to effectively transfer eggs one by one to the cups 14 of the articulated weighing conveyor, a transfer device is provided in the form of a flexible strip or flap 23, which is secured at one end at 24 to the auxiliary frame 17 and which extends over the weighing conveyor 11 so as to span at least two of the egg-carrying cups as seen, for example, in Figure 1. The strip 23 may be made of any suitable soft and flexible material such as chamois skin, for example.

In operation, as the eggs are carried along between the guide walls 21 and 22 by the belt 18, they are directed onto the transfer device 23, by the curved portion of guide wall 21. The direction of travel of the conveyor 11 tends to keep the transfer flap 23 stretched along the conveyor, the position of the flap being otherwise influenced by the weight of the eggs and the raised relation of a hinge 13 with respect to the adjacent cups.

As seen in Figure 1, an egg 26 has been deposited in one of the cups 14, with the end of the flap 23 disposed therebeneath and being drawn from beneath the egg as the egg travels along with the cup. At this time a second egg 26a is held suspended by the transfer flap 23 as a second cup 14 rises beneath it to receive the egg. The hinge pin 13 between the eggs 26 and 26a provides an effective partition which prevents attempted feeding of two eggs into a single cup.

As seen in Figure 2, the conveyor has progressed sufficiently far from the position shown in Figure 1 so that the first egg 26 is resting in the cup with the flap 23 withdrawn, while the second egg 26a has been deposited in the cup on the flap 23, and a third egg 26c is positioned at the edge of the flap 23, ready to fall into position of the egg shown at 26a in Figure 1.

We claim:

1. In an egg handling machine, a conveyor comprising a series of links, each link including a cup proportioned to carry only a single egg, hinge means connecting the links and projecting outwardly from the adjacent faces of the links, a feed conveyor for feeding eggs to said cup conveyor, a transfer device comprising a flexible flap positioned lengthwise over said cup conveyor adjacent the feed end thereof, and having one end fixed adjacent said feed conveyor, and means for directing eggs from said feed conveyor on said flap, each said hinged connection serving to raise the portion of said flap engaged therewith to form a separating partition between adjacent eggs being fed to said cups.

2. In an egg handling machine, a conveyor comprising a series of flat plate like links, each link including a cup proportioned to carry a single egg and depending from the medial portion of the link, parallel end edges of the hinges serving to connect the links, a sprocket for supporting said conveyor at its feed end, a feed conveyor for feeding eggs to said cup adjacent said sprocket, a transfer device comprising a flexible flap positioned lengthwise along said cup conveyor and disposed over the ascending portion of said cup conveyor at said sprocket, said flap having one end fixed adjacent said feed conveyor and its other end free, the flap having a width substantially equal to the width of the links, and means for directing eggs from said feed conveyor onto said flap.

3. In an egg handling machine, a cup conveyor comprising a series of links, each link including a cup proportioned to carry only a single egg, hinge means connecting the links and projecting outwardly from the adjacent faces of the links, a feed conveyor in substantially the same plane as said cup conveyor for feeding eggs to said cup conveyor, a transfer device comprising a flexible flap positioned lengthwise over said cup conveyor adjacent the feed end thereof and having one end fixed adjacent said feed conveyor, means for directing eggs from said feed conveyor on to said flap, each said hinged connection serving to first raise the portion of said flap engaged therewith to form a separating partition between the adjacent eggs being fed to said cup and form a cradle for said egg, continued movement of said cup conveyor and said hinged connection serving to lower the portion of said flap engaged therewith and said fixed end, whereby said egg and said flexible flap are lowered into an ascending cup.

4. In an egg handling machine, a cup conveyor comprising a series of links, each link including a cup proportioned to carry a single egg and depending from the medial portion of said links, parallel end portions of said links forming hinges connecting said links and projecting outwardly from the adjacent faces of said links, a sprocket for supporting said cup conveyor at its feed end, a feed conveyor in substantially the same plane as said cup conveyor for feeding eggs to each cup adjacent said sprocket, a transfer device comprising a flexible flap positioned lengthwise along said cup conveyor and disposed over the ascending portion of said cup conveyor at said sprocket, said flap having one end fixed adjacent said feed conveyor and its other end free, each of said hinged connections serving to raise the portion of said flap engaged therewith to form a cradle for holding said egg, further movement of said hinged connection serving to lower said egg and the part of said flap between the portion of the same engaged therewith and said fixed end, into an ascending cup.

CURTIS S. JORDAN.
ROBERT C. SNEED.